(No Model.)  N. WIARD.  4 Sheets—Sheet 1.

MANUFACTURE OF GUNPOWDER.

No. 273,209.  Patented Feb. 27, 1883.

Witnesses;
D. Walter Fowler,
R. K. Evans

Inventor;
Norman Wiard
by A. H. Evans & Co
attys (No Model.) 4 Sheets—Sheet 2.

N. WIARD.
MANUFACTURE OF GUNPOWDER.

No. 273,209. Patented Feb. 27, 1883.

Attest.
R. K. Evans.
D. P. Cowl

Inventor:
Norman Wiard (No Model.) 4 Sheets—Sheet 3.

N. WIARD.
MANUFACTURE OF GUNPOWDER.

No. 273,209. Patented Feb. 27, 1883.

Witnesses. R. K. Evans. D. P. Cone

Inventor (No Model.) 4 Sheets—Sheet 4.
N. WIARD.
MANUFACTURE OF GUNPOWDER.
No. 273,209. Patented Feb. 27, 1883.
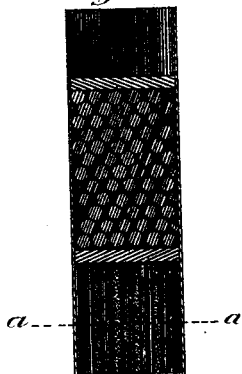
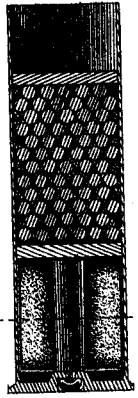
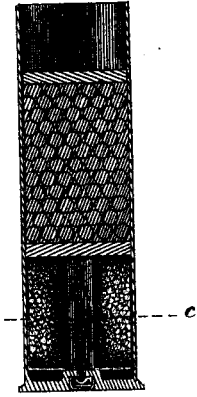
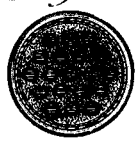
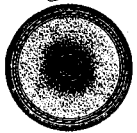
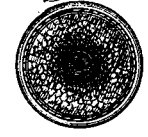
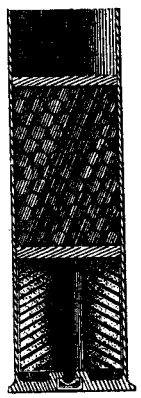
Attest:
R. K. Evans.
Inventor;
Norman Wiard

UNITED STATES PATENT OFFICE.

NORMAN WIARD, OF WASHINGTON, DISTRICT OF COLUMBIA, ASSIGNOR TO ROBERT C. SCHENCK AND HENRY D. COOKE, BOTH OF SAME PLACE.

MANUFACTURE OF GUNPOWDER.

SPECIFICATION forming part of Letters Patent No. 273,209, dated February 27, 1883.

Application filed March 2, 1882. (No specimens.)

*To all whom it may concern:*

Be it known that I, NORMAN WIARD, of Washington, in the District of Columbia, have invented certain Improvements in Gunpowder; and I hereby declare the following to be a full, clear, and exact description thereof, reference being had to the accompanying drawings, making part of this specification, in which—

Figure 1:
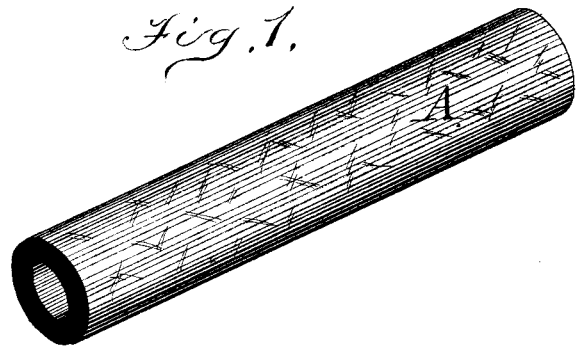
Figure 2:
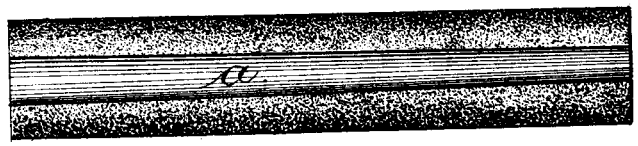
Figure 3:
Figure 4:
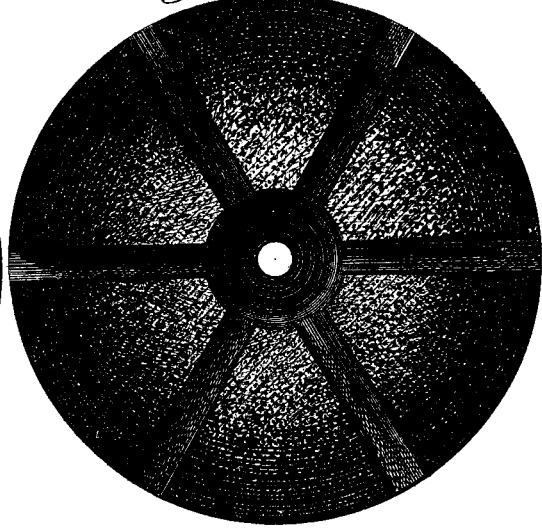
Figure 5:
Figure 6:
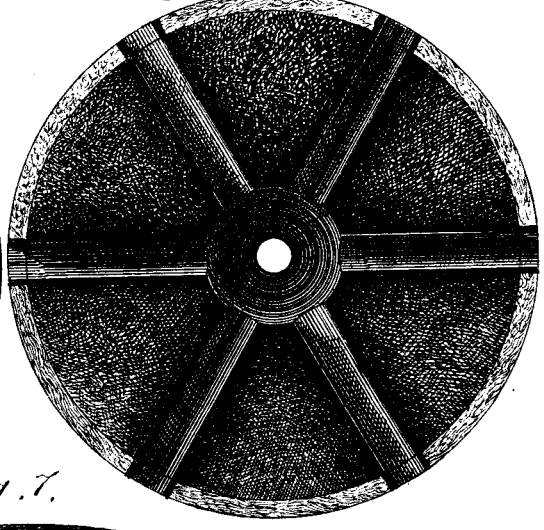
Figure 7:
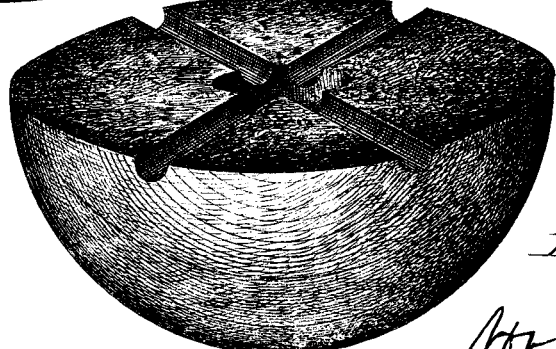
Figure 10:
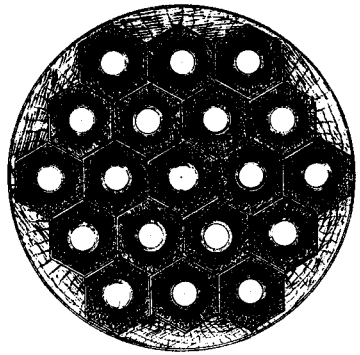
Figure 8:
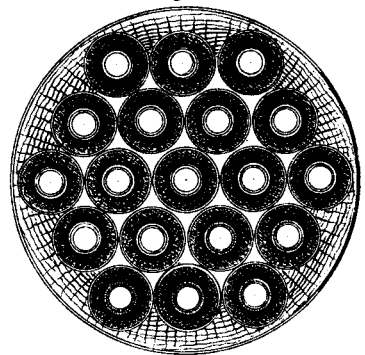
Figure 11:
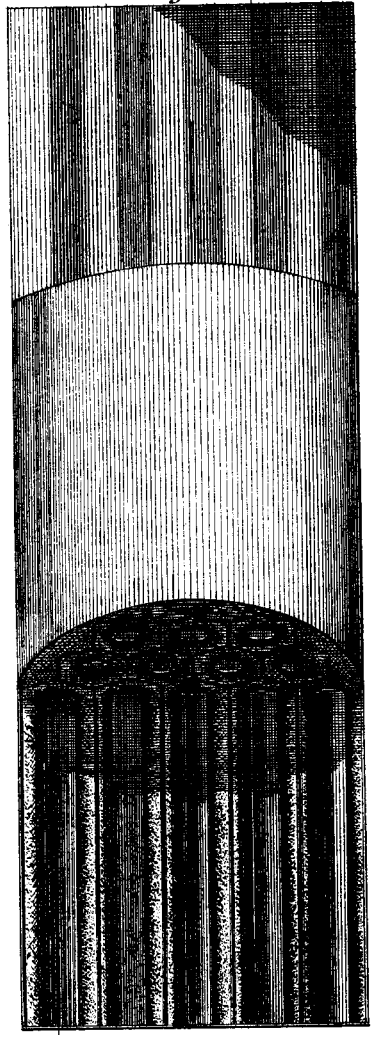
Figure 9:
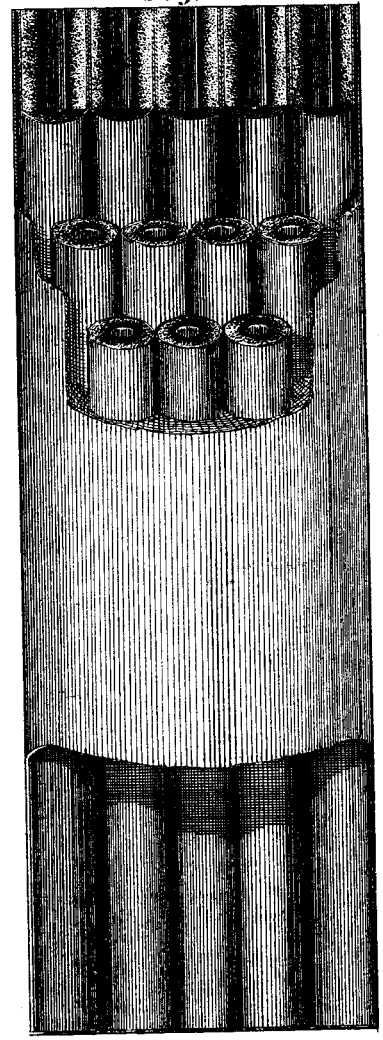

Figure 1 is a perspective view of a grain of my improved powder. Fig. 2 shows a longitudinal section of the same. Figs. 3, 4, 5, 6, and 7 illustrate a modification in the form of the grain. Figs. 8, 9, 10, and 11 illustrate the grains fagoted and wrapped to form a powder-cartridge for a cannon of large caliber. Figs. 12 to 23, inclusive, illustrate adaptations of my invention for use in fowling-pieces and other small-arms, or for cannon of lower caliber.

Heretofore all gunpowders have been made with the grains compressed upon their outer surfaces only to produce a desired density. Powders so made present the greatest, or exterior surface, area of burning-surface at the initial ignition of the charge, and as the grains burn and decrease in size the combustion-surface correspondingly decreases, so that the greatest gas-producing capacity of the charge of powder is at or immediately after the initial ignition of the charge, when the inertia of the shot has not been overcome, or when the shot has started to move at a very low velocity, and the production of gas from that instant decreases until the entire charge is converted into gas. There results from this operation the greatest strain on the gun at the moment of the impact of the powder charge upon the projectile, and from the moment the inertia of the projectile is overcome until it leaves the muzzle of the gun the rapidity of the production of gases from the powder charge is constantly on the decrease, being the reverse of the conditions necessary to produce the best results.

The object of my invention is to overcome the objections above named, and to produce a gunpowder which in its combustion will first overcome the inertia of the projectile, and thereafter produce gases with such rapidly-increasing volumes as will accelerate the travel of the projectile through the bore of the gun and give the highest pressure and greatest velocity, if desired, when the projectile leaves the muzzle, or at that part of the length of the bore which will impart the highest velocity to the projectile with a given quantity of powder burned within a bore of given capacity—conditions which my improved powder, herein described, by or through its adjustability to differing rates of development of gases, is intended to accommodate.

The machinery necessary to rapidly make this improved powder will form the subject-matter of separate applications for patents.

My invention consists, first, in a perforated pellet or grain of gunpowder having a greatly-increased density on its outer surface, whereby the grain under combustion from all its surfaces will burn most slowly from those surfaces which are being reduced in area and most rapidly from those surfaces which are being increased in area as the combustion progresses; secondly, in a grain of gunpowder of varying density of burning-surfaces of a tubular form provided with a tapering perforation.

In order that those skilled in the art may make and use my invention, I will proceed to describe the manner in which I have carried it out.

In the said drawings, Fig. 1, A is an elongated pellet or grain of gunpowder provided with a tapering opening or perforation, *a*. The density of the exterior of the pellet or grain is greater than the density of the interior, and the variation is made in such a ratio that when the pellet or grain is under combustion the gas-producing capacity of the interior surface is at the initial ignition equal to the gas-producing capacity of the exterior or greater surface, and as the interior surface increases in area and the exterior surface decreases the combustion attacks the intermediate portion of the grain, which, being of less density than the surfaces, burns with much greater rapidity and evolves an accelerated volume of gas. For use these pellets or grains of powder are laid up in cylindrical bundles or fagots, corresponding in diameter to the bore of the gun in which they are to be used, (see Figs. 8, 9, 10, and 11,) with the larger ends of the tapering perforations *a* all at the same end of the package, and this package is surrounded by any desirable wrapper to keep the pellets or grains in position, thereby forming a powder-cartridge.

In loading, the cartridges are inserted with the smaller ends of the perforations a a toward the breech of the gun, and the firing charge or fulminate flashes through the perforations and fires the individual pellets or grains primarily from their interior surfaces. The tapering form of the perforations, the larger ends being next to the projectile, provides for a free escape of gases in that direction and prevents the fracture of the pellets or grains from internal pressure. When it is designed to burn the grain from both surfaces the hot gases rebound over the exterior surfaces of the grains and ignite them.

In the modification shown in Figs. 3, 4, 5, 6, and 7 the same varying density of surface is applied to spherical powder particularly adapted for great guns.

Modifications of my invention adapted for use in fowling-pieces are illustrated in Figs. 12 to 23, inclusive.

The variation in the density of the burning-surfaces may be accomplished by molding the plastic powder composition under a given pressure and then allowing it to dry from either surface designed to have the lower density, and subsequently, before the other surface has thoroughly dried, subjecting it to a greatly-increased pressure. It is obvious that any other practicable means for producing the same result may be used without departing from the spirit of my invention.

I am aware that a pellet or grain of powder having perforations in it is not broadly new.

Having thus described my invention, what I claim as new, and desire to secure by Letters Patent, is—

1. Gunpowder consisting of punctured or perforated pellets or grains having burning-surfaces of different density.

2. A perforated pellet or grain of gunpowder having its exterior surface of greater density than its interior surface, substantially as and for the purpose set forth.

3. A pellet or grain of gunpowder having varying density of burning-surfaces, provided with a tapering perforation, for the purpose specified.

NORMAN WIARD.

Witnesses:
JOHN P. HAMLIN,
T. J. WALTERS.